United States Patent
Kim

(10) Patent No.: US 8,767,101 B2
(45) Date of Patent: Jul. 1, 2014

(54) IMAGE PROCESSING APPARATUS AND SYSTEM

(75) Inventor: Min Seok Kim, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 398 days.

(21) Appl. No.: 13/298,532

(22) Filed: Nov. 17, 2011

(65) Prior Publication Data

US 2012/0127347 A1     May 24, 2012

(30) Foreign Application Priority Data

Nov. 19, 2010    (KR) ..................... 10-2010-0115614

(51) Int. Cl.
    *H04N 5/208*       (2006.01)
    *H04N 9/68*        (2006.01)
    *H04N 9/083*       (2006.01)

(52) U.S. Cl.
    USPC .......................... 348/252; 348/234; 348/272

(58) Field of Classification Search
    USPC .......... 348/241, 252, 597; 382/162, 167, 199, 382/266, 274
See application file for complete search history.

(56) References Cited

U.S. PATENT DOCUMENTS

| 6,563,537 | B1 | 5/2003 | Kawamura et al. | |
| 2007/0002154 | A1* | 1/2007 | Kang et al. | 348/272 |
| 2008/0266432 | A1* | 10/2008 | Tsuruoka | 348/294 |

FOREIGN PATENT DOCUMENTS

| JP | 11-103466 A | 4/1999 |
| KR | 1020060131083 A | 12/2006 |

* cited by examiner

*Primary Examiner* — Lin Ye
*Assistant Examiner* — Euel Cowan
(74) *Attorney, Agent, or Firm* — William Park & Associates Patent Ltd.

(57) ABSTRACT

There is provided an image processing apparatus and system for demosaicing. The image processing apparatus comprises an edge determination module configured to determine whether a target pixel is an edge pixel and a direction of an image edge if the target pixel is an edge pixel; and a demosaicing module configured to extract a luminance component value of the target pixel using a Bayer image pattern having the target pixel in a central portion of the Bayer image pattern, wherein the demosaicing module is configured to extract the luminance component value of the target pixel using the Bayer image pattern by a weighting process if the target pixel is determined as an edge pixel.

18 Claims, 6 Drawing Sheets

IMAGE PROCESSING APPARATUS AND SYSTEM

CROSS-REFERENCE TO RELATED APPLICATIONS

This application claims priority to Korean Patent Application No. 10-2010-0115614 filed on Nov. 19, 2010, in the Korean Intellectual Property Office, the disclosure of which is incorporated herein by reference in its entirety.

BACKGROUND OF THE INVENTION

1. Field of the Invention

The present invention relates generally to an image processing, and more particularly to an image processing apparatus and system for demosaicing.

2. Description of the Related Art

In recent years, digital cameras have been used for both personal and business purposes. The digital camera performs various image processes.

A demosaicing algorithm is an image processing method that interpolates two different color components from raw pixel data that come from pixels adjacent to one another. For example, if a predetermined pixel is set to detect a red signal, then green and blue signals may be interpolated from raw data of adjacent pixels using a demosaicing algorithm.

In general, interpolation data is generated by calculating an average color value based on color values surrounding a point for which the average color value is calculated. A significant difference in color values of the same color may be present at the edges of an image. In this case, if an average of color values at the edges is calculated, blurring may occur at the edges.

SUMMARY OF THE INVENTION

An aspect of the present invention provides an image processing apparatus and system capable of detecting edges of an image and performing a demosaicing operation thereupon.

According to an aspect of the present invention, there is provided an image processing apparatus comprising: an edge determination module configured to determine whether a target pixel is an edge pixel and a direction of an image edge if the target pixel is an edge pixel; and a demosaicing module configured to extract a luminance component value of the target pixel using a Bayer image pattern having the target pixel in a central portion of the Bayer image pattern, wherein the demosaicing module is configured to extract the luminance component value of the target pixel using the Bayer image pattern by a weighting process if the target pixel is determined as an edge pixel.

According to another aspect of the present invention, there is provided an image processing system including: a storage apparatus storing image data of a plurality of pixels to be processed; and an image processing apparatus performing image processing with respect to image data of a target pixel using an n×n Bayer image pattern having the target pixel in a central portion thereof, and including an edge determination module determining whether the target pixel is an edge pixel or not and a direction of an image edge when the target pixel is determined as the edge pixel, and a demosaicing module extracting a luminance component value of the target pixel using the n×n Bayer image pattern.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
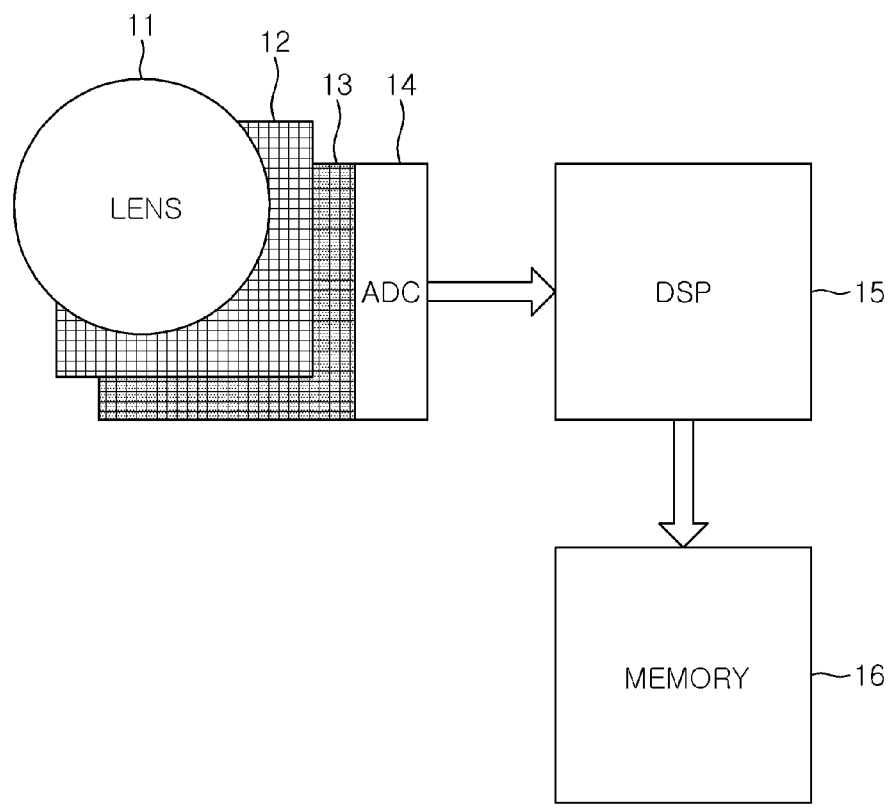
FIG. 1 is a view illustrating a general digital camera.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Moreover, detailed descriptions related to well-known functions or configurations will be ruled out in order to avoid unnecessarily obscuring subject matters of the present invention.

In order to clarify various embodiments of the present invention, parts not needed for the description of the present invention may be omitted from the drawings. The same reference numerals will be used throughout the diagrams to designate the same or like elements.

In addition, unless explicitly described to the contrary, the word "comprise" and variations such as "comprises" or "comprising," will be understood to imply the inclusion of stated elements but not the exclusion of any other elements.

FIG. 1 is a view illustrating a general digital camera.

With reference to FIG. 1, a digital camera 10 generally comprises at least one lens 11, at least one filter 12, at least one image sensor array 13, an analog-to-digital converter (ADC) 14, a digital signal processor (DSP) 15 and a memory 16.

The image sensor array 13 may comprise a two-dimensional array of a plurality of imaging pixels, each of which converts light (i.e., photons) to electricity (i.e., electrons). The image sensor array 13 may be a charge-coupled device (CCD) image sensor or a complementary metal-oxide semiconductor (CMOS) image sensor.

The filter 12 may be a Bayer filter having a mosaic of monochrome pixels. The mosaic of monochrome pixels are typically arranged in a pattern of red (R), green (G) and blue (B) pixels.

The digital camera 10 may include the lens 11 to focus light on the image sensor array 13. Photons passing through each monochrome pixel of the Bayer filter 12 are sensed by a corresponding pixel sensor in the image sensor array 13. The ADC 14 converts the intensity of photons sensed by the image sensors array 13 into corresponding raw digital pixel data. The raw digital pixel data is processed by the DSP 15 to produce final interpolated pixel data. The final interpolated pixel data is stored in the memory 16. The memory 16 may also store the raw digital pixel data.

Figure 2:
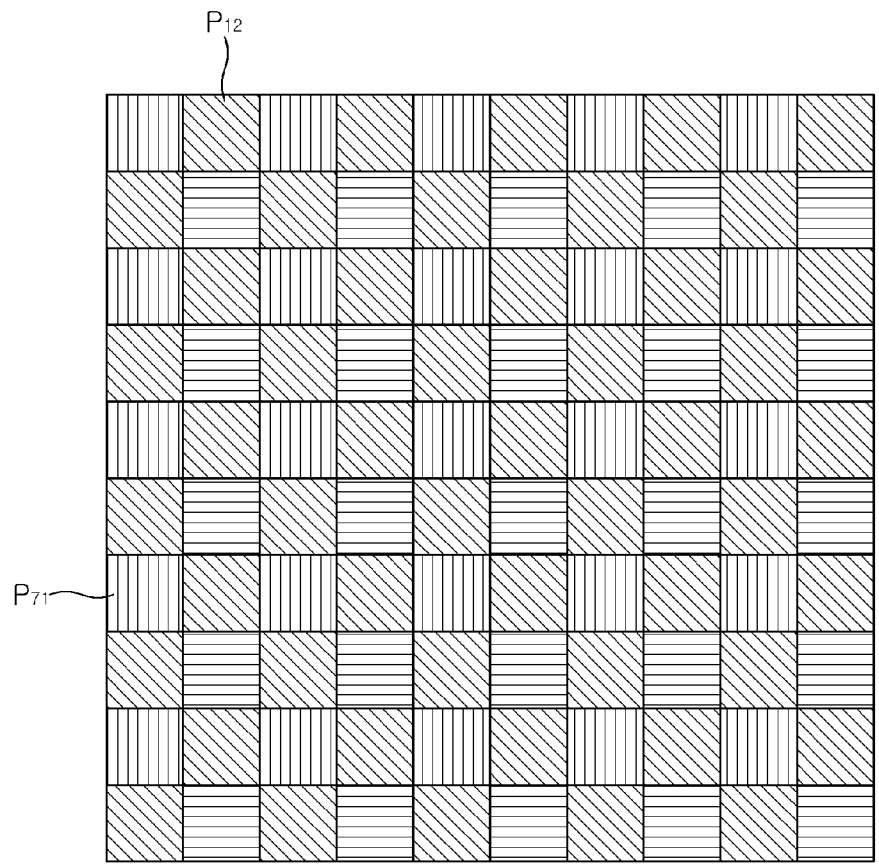
FIG. 2 is a view illustrating a general Bayer filter.
Figure 2:
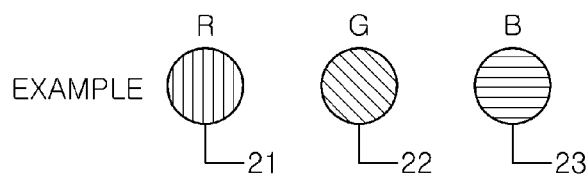

FIG. 2 is a view illustrating a general Bayer filter.

With reference to FIG. 2, in the Bayer filter pattern, a row of red filters 21 and green filters 22 are alternated with a row of blue filters 23 and green filters 22. Each pixel of the Bayer filter detects a single color. A 2×2 pixel cluster on a sensor plane, may be comprised of interleaved red, green and blue filters. Filters interleaved in this manner may comprise two pixels, Gr and Gb for example, for detecting green information; a single pixel R detecting red information; and a single pixel B detecting blue information.

Figure 3:
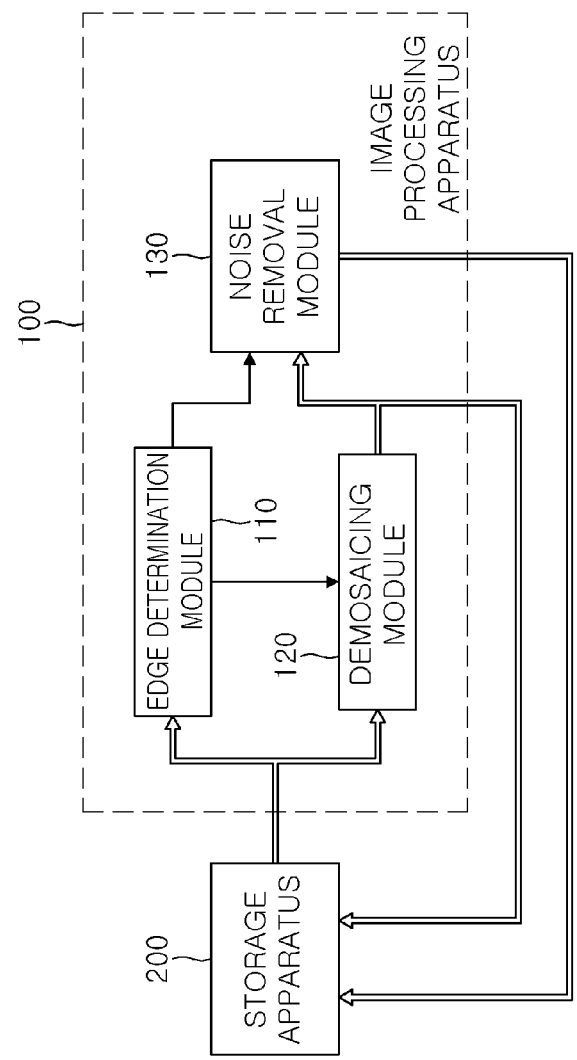
FIG. 3 is a functional block diagram illustrating an image processing system according to an embodiment of the present invention.

FIG. 3 is a functional block diagram illustrating an image processing system according to an embodiment of the present invention.

With reference to FIG. 3, an image processing system may comprise a storage apparatus 200 and an image processing apparatus 100.

The storage apparatus 200 may store image data of at least one a target pixel to be processed and image data of pixels adjacent to the target pixel. The storage apparatus 200 may transmit the stored image data to the image processing apparatus 100, and may retain image data of the processed target pixel as necessary.

The image processing apparatus 100 may include an edge determination module 110 and a demosaicing module 120. The image processing apparatus 100 may further include a noise removal module 130.

The edge determination module 110 may determine whether or not the target pixel is an edge pixel, and if the target pixel is an edge pixel, the determination module 110 may determine a direction or orientation of an image edge. In general, since luminance tends to be dramatically changed at an image edge, it is necessary to determine whether the target pixel is an edge pixel and verify the direction of the image edge, that is whether the image edge is disposed in a vertical or horizontal direction. An edge pixel may be one of a group of pixels that may tend toward the image edge.

Information on whether the target pixel is an edge pixel, and whether the image edge where the target pixel resides is disposed in a vertical or horizontal direction, may be transmitted to the demosaicing module 120 and to the noise removal module 130.

The demosaicing module 120 may extract a luminance component value from the target pixel using an n×n Bayer image pattern. If the target pixel is an edge pixel, the demosaicing module 120 may extract the luminance component value of the target pixel by a weighting process using the Bayer image pattern.

If the target pixel is an edge pixel, the demosaicing module 120 may interpolate the luminance component value of the target pixel using pixels adjacent to the target pixel. That is, in a case in which the target pixel is determined as an edge pixel, the demosaicing module 120 may interpolate the luminance component value of the target pixel with reference to the adjacent pixels along the image edge.

The demosaicing process may strengthen an image edge that may lead to a vivid image and a reduction of noise associated with the target pixel as well as other pixels.

Figure 4:
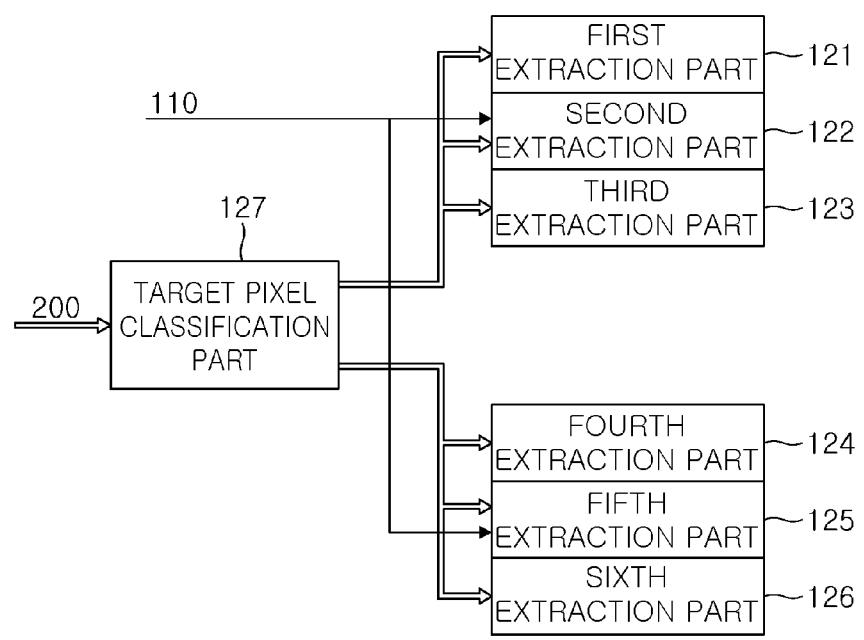
FIG. 4 is a functional block diagram illustrating a demosaicing module of an image processing apparatus according to an embodiment of the present invention.

FIG. 4 is a functional block diagram illustrating a demosaicing module of an image processing apparatus according to an embodiment of the present invention.

With reference to FIG. 4, the demosaicing module 120 may comprise first to sixth extraction components 121 to 126, and may further comprise a target pixel classification component 127.

The demosaicing module 120 of the image processing apparatus 100 may utilize a 5×5 Bayer image pattern. In an embodiment using a 5×5 Bayer image pattern, the target pixel may be a pixel arranged in a third row and a third column, and a luminance component value of a pixel arranged in an i-th row and a j-th column may be defined as $P_{ij}$.

If the target pixel is an R or a B pixel, the first to third extraction components 121 to 123 extract R, G and B luminance component values interpolated with respect to the target pixel.

If the target pixel is an R pixel, the first extraction component 121 may extract an R luminance component value. If the target pixel is a B pixel, the first extraction component 121 may extract a B luminance component value. This extraction process is undertaken using the following Equation 1:

$$RB_{RB} = \frac{\begin{array}{c}P_{11} + 6*P_{31} + P_{51} + 6*P_{13} + \\ 36*P_{33} + 6*P_{53} + P_{15} + 6*P_{35} + P_{55}\end{array}}{64} \qquad \text{Equation 1}$$

If the target pixel is an R or a B pixel, the second extraction component 122 may extract a G luminance component value. This extraction process is undertaken using the following Equation 2:

$$G_{RB\_W0} = \frac{P_{32} + P_{23} + P_{43} + P_{34}}{4} \qquad \text{Equation 2}$$

Also, if the target pixel is an edge pixel and a weight parameter m is set as one of 1 to 3, a weight of each pixel may be applied to Equation 2.

If the weight parameter m is set as one of 1 to 3, the extraction process may be undertaken using the following Equation 3:

$$G_{RB\_Wm} = \frac{(P_{23} + P_{43})*a + (P_{32} + P_{34})*b}{8*2^m} \qquad \text{Equation 3}$$

If the weight parameter m is set to 1 and the image edge is arranged in a vertical direction, then a=7 and b=1. But, if weight parameter m is set to 1 and the image edge is arranged in a horizontal direction, then a=1 and b=7.

If the weight parameter m is set to 2, and the image edge is arranged in a vertical direction, then a=15 and b=1. But, if the weight parameter m is set to 2 and the image edge is arranged in a horizontal direction, then a=1 and b=15.

If the weight parameter m is set to 3 and the image edge is arranged in a vertical direction, then a=31 and b=1. But, if the weight parameter m is set to 3 and the image edge is arranged in a horizontal direction, then a=1 and b=31.

If the target pixel is an R pixel, the third extraction component 123 may extract a B luminance component value. If the target pixel is a B pixel, the third extraction component 123 may extract an R luminance component value. This extraction process is undertaken using the following Equation 4:

$$BR_{RB} = \frac{P_{22} + P_{24} + P_{42} + P_{44}}{4} \qquad \text{Equation 4}$$

If the target pixel is a Gr or a Gb pixel, the fourth to sixth extraction components 124 to 126 extract R, G and B luminance component values that may be interpolated with respect to the target pixel.

If the target pixel is a Gr pixel, the fourth extraction component 124 may extract an R luminance component value. If the target pixel is a Gb pixel, the fourth extraction component 124 may extract a B luminance component value. This extraction process may be undertaken using the following Equation 5:

$$RB_{GG} = \frac{P_{21} + P_{41} + 6*P_{23} + 6*P_{43} + P_{25} + P_{45}}{16} \qquad \text{Equation 5}$$

If the target pixel is a Gr or a Gb pixel, the fifth extraction component 125 may extract a G luminance component value. This extraction process may be undertaken using the following Equation 6:

$$G_{GG\_W0} = \frac{P_{22} + P_{42} + 4*P_{33} + P_{24} + P_{44}}{8} \qquad \text{Equation 6}$$

Also, if the target pixel is an edge pixel and the weight parameter m is set as one of 1 to 3, a weight of each pixel may be applied to Equation 6.

If the weight parameter m is set as one of 1 to 3, the extraction process is undertaken using the following Equation 7:

$$G_{GG\_Wm} = \frac{P_{22} + P_{42} + c*P_{33} + P_{24} + P_{44}}{8*2^m} \qquad \text{Equation 7}$$

If the weight parameter m is set as 1, c=12. If the weight parameter m is set as 2, c=28. If the weight parameter m is set as 3, c=60.

If the target pixel is a Gr pixel, the sixth extraction component 126 extracts a B luminance component value. If the target pixel is a Gb pixel, the sixth extraction component 126 may extract an R luminance component value. This extraction process may be undertaken using the following Equation 8:

$$BR_{GG} = \frac{P_{12} + 6*P_{32} + P_{52} + P_{14} + 6*P_{34} + P_{54}}{16} \qquad \text{Equation 8}$$

The target pixel classification component 127 may determine whether the target pixel is an R or a B pixel or the target pixel is a Gr or a Gb pixel. The target pixel classification component 127 may transmit pixel data received from the storage apparatus 200 to the first to third extraction components 121 to 123, or the fourth to sixth extraction components 124 to 126.

In addition, the target pixel classification component 127 may select three extraction components for interpolating luminance components of the target pixel between the first to third extraction components 121 to 123 and the fourth to sixth extraction components 124 to 126. This interpolation may be performed using color information of the target pixel received from the edge determination module 110.

Figure 5:
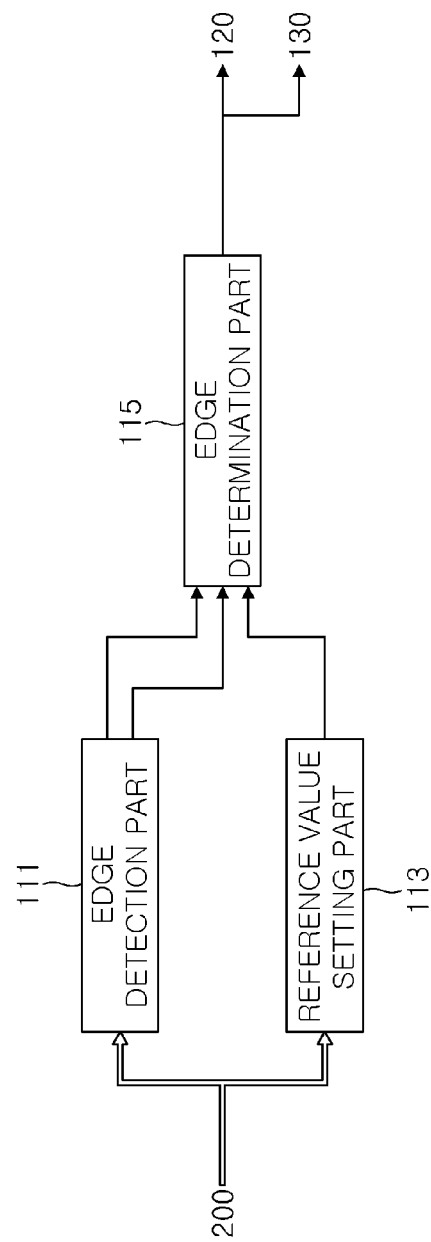
FIG. 5 is a functional block diagram illustrating an edge determination module of an image processing apparatus according to an embodiment of the present invention.

FIG. 5 is a functional block diagram illustrating an edge determination module of an image processing apparatus according to an embodiment of the present invention.

With reference to FIG. 5, the edge determination module according to an embodiment of the present invention may include an edge detection component 111, a reference value setting component 113, and an edge determination component 115.

The edge detection component 111 may detect horizontal and vertical components for edge determination.

A horizontal edge target component $E_H$ may be determined by calculating a horizontal difference using a row to which the target pixel belongs and adjacent upper and lower rows and calculating an arithmetic average thereof.

The horizontal difference calculation is undertaken using the following Equation 9, where $E_{H1}$ may be a first partial horizontal edge target component calculation, and $E_{H2}$ may be a second partial horizontal edge target component calculation:

$$E_{H1}=|P_{33}-P_{13}|+|P_{43}-P_{23}|+|P_{32}-P_{12}|+|P_{34}-P_{14}|$$

$$E_{H2}=|P_{33}-P_{53}|+|P_{23}-P_{43}|+|P_{32}-P_{52}|+|P_{34}-P_{54}| \qquad \text{Equation 9}$$

An arithmetic average of $E_{H1}$ and $E_{H2}$ is obtained using the following Equation 10:

$$E_H = \frac{E_{H1}}{4} + \frac{E_{H2}}{4} \qquad \text{Equation 10}$$

A vertical edge target component $E_V$ may be determined by calculating a vertical difference using a column to which the target pixel belongs and adjacent left and right columns and calculating an arithmetic average thereof.

The vertical difference calculation is undertaken using the following Equation 11, where $E_{V1}$ may be a first partial vertical edge target component calculation, and $E_{V2}$ may be a second partial vertical edge target component calculation:

$$E_{V1}=|P_{33}-P_{31}|+|P_{34}-P_{32}|+|P_{23}-P_{21}|+|P_{43}-P_{41}|$$

$$E_{V2}=|P_{33}-P_{35}|+|P_{32}-P_{34}|+|P_{23}-P_{25}|+|P_{43}-P_{45}| \qquad \text{Equation 11}$$

An arithmetic average of $E_{V1}$ and $E_{V2}$ is obtained using the following Equation 12:

$$E_V = \frac{E_{V1}}{4} + \frac{E_{V2}}{4} \qquad \text{Equation 12}$$

$E_H$ and $E_V$ may be transmitted to the edge determination component 115.

In general, the degree of luminance of a pixel area may be significantly different based on whether the pixel area is a dark pixel area or a bright pixel area. For a dark pixel area, a luminance code value difference between a pixel having a luminance code value of 20 and a pixel having a luminance code value of 40 is 20, but a luminance rate difference between these pixels is 100%. On the other hand, if the pixel area is part of a bright pixel area, a luminance code value difference between a pixel having a luminance code value of 220 and a pixel having a luminance code value of 240 is 20, but a luminance rate difference between these pixels is merely 9%.

Therefore, the target pixel may be considered as an edge pixel in the dark pixel area, whereas it may not be considered as an edge pixel in the bright pixel area. Therefore, a curve adaptive to the degree of luminance is made to set a reference value for edge determination depending on a corresponding luminance level of a pixel area wherein the target pixel is located.

The reference value setting component 113 sets a reference value adaptive to the luminance of the pixel area where the target pixel is located. The reference value may assist in edge determination.

If the target pixel is a Gr or a Gb pixel, the reference value setting component 113 may set a reference value for edge determination by assigning an average luminance value of the target pixel and adjacent surrounding pixels within a 5×5 pixel block to a predetermined adaptive curve. Here, the average luminance value may be obtained by using the following $G_{GG}$ version of Equation 13:

If the target pixel is an R or a B pixel, the reference value setting component 113 may set a reference value for edge determination by assigning an average luminance value of the target pixel and adjacent surrounding pixels within a 5×5 pixel block to a predetermined adaptive curve. Here, the average luminance value may be obtained by using the following $G_{RB}$ version of Equation 13:

$$G_{RB} = \frac{\begin{array}{c}P_{21} + P_{41} + P_{12} + 2*P_{32} + P_{52} + 2*P_{23} + \\ 2*P_{23} + 2*P_{34} + P_{14} + P_{54} + P_{25} + P_{45}\end{array}}{16}$$

$$G_{GG} = \frac{\begin{array}{c}P_{11} + P_{31} + P_{51} + P_{22} + P_{42} + P_{13} + P_{33}* \\ 4 + P_{53} + P_{24} + P_{44} + P_{15} + P_{35} + P_{55}\end{array}}{16}$$

Equation 13

Figure 6:
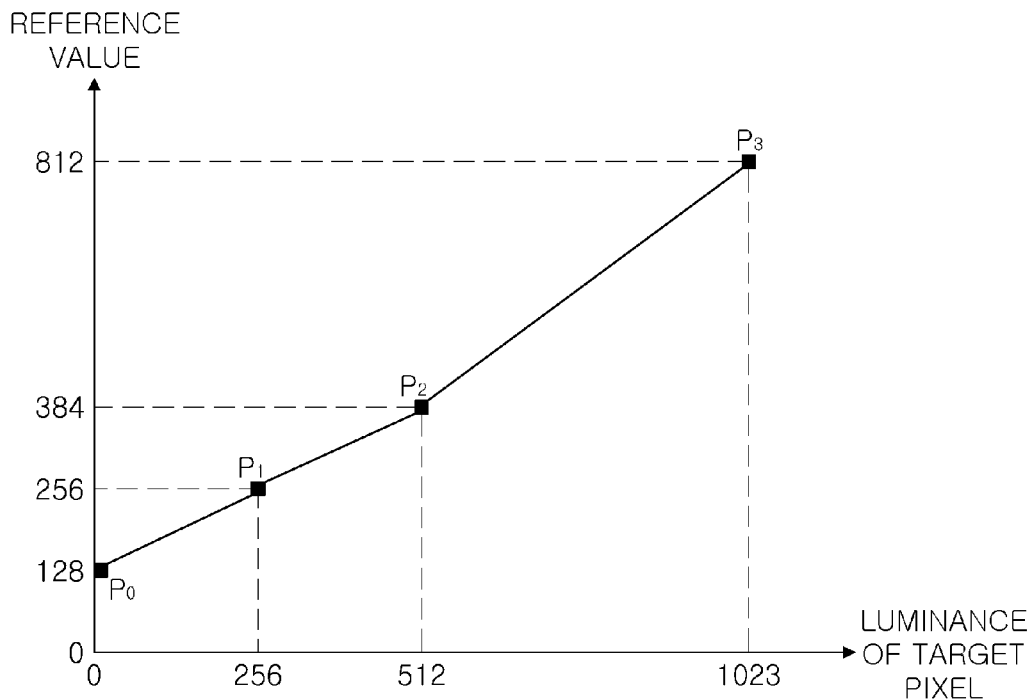
FIG. 6 is a graph illustrating an adaptive curve for setting a reference value in a reference value setting part of an image processing apparatus according to an embodiment of the present invention.

With reference to FIG. 6, the curve used in the reference value setting component 113 for edge determination is a reference value curve adaptive to luminance component values of the adjacent surrounding pixels.

This reference value curve may be formed of segments connecting four movable reference points. The four reference points may form an environmentally adaptive reference value curve. Furthermore, in order to reflect environmental factors, additional reference points may be used as necessary.

The graph of FIG. 6 is comprised of an X-axis indicating an average luminance value of a target pixel, and a Y-axis indicating a reference value for edge determination. Accordingly, an X-coordinate indicates average luminance value, and a Y-coordinate indicates a reference value corresponding to the value of the X-coordinate.

The image processing apparatus 100 according to an embodiment of the invention interpolates the luminance component value of the target pixel through an edge determination process that determines whether the target pixel is an edge pixel by comparing the luminance component value of the target pixel with the luminance component values of the adjacent surrounding pixels. Thus, the luminance component value is interpolated using an edge determination process rather than interpolating the luminance component value of the target pixel with reference to the luminance component values of the adjacent surrounding pixels. Therefore, the image processing apparatus 100 may allow for active and adaptive image processing.

If the vertical and horizontal edge target components of the target pixel do not reach a reference value for edge determination, the edge determination component 115 determines that the target pixel is a flat pixel, not an edge pixel. If the vertical edge target component is greater than the horizontal edge target component and also greater than a reference value for edge determination, the edge determination component 115 determines that the target pixel is a vertical edge pixel. If, on the other hand, the horizontal edge target component is greater than the vertical edge target component and also greater than a reference value for edge determination, the edge determination component 115 determines that the target pixel is a horizontal edge pixel.

The determinations of whether a target pixel is a flat pixel, or a vertical or horizontal edge pixel may be expressed by the following conditional Equation 14:

$$\text{classifier} = \begin{cases} \text{if } (E_H < THR_{ADT}) \& (E_V < THE_{ADT}); & \text{FLAT} \\ \text{else if } (E_H > E_V); & \text{VERTICAL} \\ \text{else if } (E_H < E_V); & \text{HORIZONTAL} \end{cases}$$

Equation 14

Here, $THR_{ADT}$ refers to a reference value for edge determination that may be set by the reference value setting component 120.

The information on whether the target pixel is an edge pixel and on the direction of the image edge when the target pixel is determined as an edge pixel may be transmitted by the edge determination component 115 to the demosaicing module 120 and to the noise removal module 130.

Figure 7:
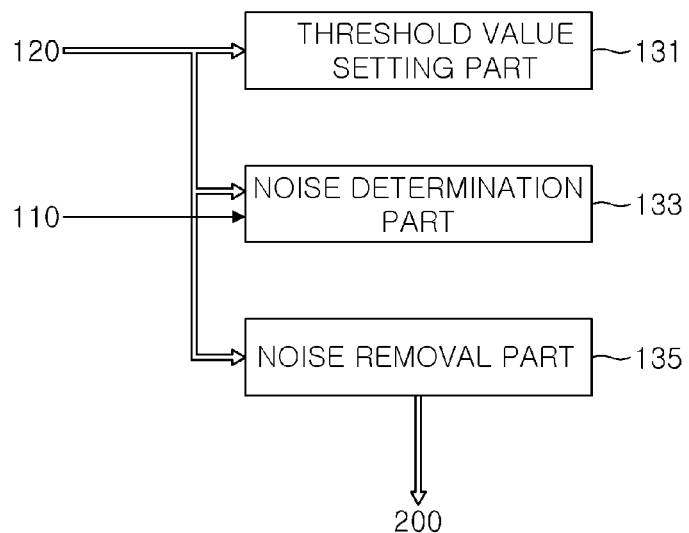
FIG. 7 is a functional block diagram illustrating a noise removal module of an image processing apparatus according to an embodiment of the present invention.

FIG. 7 is a functional block diagram illustrating a noise removal module of an image processing apparatus according to an embodiment of the present invention.

With reference to FIG. 7, the noise removal module 130 according to an embodiment of the invention may comprise a threshold value setting component 131, a noise determination component 133, and a noise removal component 135.

If the target pixel is determined as a flat pixel, R, B and G luminance component values of adjacent surrounding n×n Bayer pixels are maintained at a consistent rate. Image noise may be generated if the R and B luminance component values have relatively less luminance data as interpolated by the demosaicing module 120. Therefore, if the R and B luminance component values are in a range between a minimum ($thr_{min}$) and a maximum ($thr_{max}$) threshold value derived from the Equation 15 seen below, image noise may be generated, and accordingly, noise calibration may be required.

However, specific pixels, R, B and G luminance component values may be greatly changed. Therefore, if one of the R and B luminance component values is beyond a threshold value range, there may be no generation of image noise. However, when either the R or B luminance component value is beyond the threshold value range, the color information of the target pixel itself may have an error.

The threshold value setting component 131 may set a threshold value for determining whether or not it is necessary to remove image noise from the demosaicing luminance component value of the target pixel.

The minimum and maximum threshold values are obtained by using the following Equation 15:

$$thr_{min} = G_{old} - \text{ratio}_{fcs}$$

$$thr_{max} = G_{old} + \text{ratio}_{fcs}$$

Equation 15

Here, $\text{ratio}_{fcs}$ is a constant obtained by experimentation and may be stored in a register or the like.

If the target pixel is determined to be a flat pixel and the R and B luminance component values are within the threshold value range defined by Equation 15, the noise determination component 133 determines that image noise may be generated in the target pixel.

If the noise determination component 133 determines that a target pixel has image noise, the noise removal component 135 may use Equations 16 and 17 to remove image noise of the target pixel with respect to the R and B luminance component values. Equations 16 and 17 are defined as:

$$R_{fcs}=(R_{old}*(8-THR_{fcs})+G_{old}*THR_{fcs})/8 \quad \text{Equation 16}$$

$$B_{fcs}=(B_{old}*(8-THR_{fcs})+G_{old}*THR_{fcs})/8 \quad \text{Equation 17}$$

The R and B luminance component values are interpolated by using a G luminance component value having relatively sufficient luminance data. Here, $THR_{fcs}$ may be derived through experimentation.

The image processing apparatus 100 according to some embodiments of the invention is capable of adaptively performing image processing by determining whether the target pixel is an edge pixel or not by using information of the adjacent surrounding pixels. In a case in which the target pixel is determined as an edge pixel, luminance components thereof may be strengthened considering the direction of the image edge, whereby the definition of the image edge may be improved. If the target pixel is a flat pixel, image noise caused by interpolation may be removed, whereby image quality may be improved.

As set forth above, by the use of an image processing apparatus and system according to embodiments disclosed herein, the definition of edges of an image can be sharpen by performing a demosaicing operation thereupon.

While the present invention has been shown and described in connection with embodiments disclosed herein, it will be apparent to those skilled in the art that modifications and variations can be made without departing from the spirit and scope of the invention as defined by the appended claims.

What is claimed is:

1. An image processing apparatus comprising:
an edge determination module configured to determine whether a target pixel is an edge pixel and a direction of an image edge if the target pixel is an edge pixel; and
a demosaicing module configured to extract a luminance component value of the target pixel using a Bayer image pattern comprising the target pixel in a central portion of the Bayer image pattern,
wherein the demosaicing module is configured to extract the luminance component value of the target pixel using the Bayer image pattern by a weighting process if the target pixel is an edge pixel,
a target pixel classification component configured to classify the target pixel as a Red, Blue, Or or Gb pixel,
a first, a second and a third individual extraction components each configured to respectively extract red (R), blue (B) and green (G) luminance component values of the target pixel if the target pixel is classified as an R or B pixel; and
fourth, fifth and sixth individual extraction components each configured to respectively extract R, B and G luminance component values of the target pixel if the target pixel is classified as a Gr or Gb pixel.

2. The image processing apparatus of claim 1, wherein, the Bayer image pattern comprises an n×n pattern, n is set as 5, the target pixel as $P_{33}$, and a pixel arranged in an I-th row and a j-th column as $P_{ij}$,
the first extraction component extracts the R luminance component value if the target pixel is the R pixel, and extracts the B luminance component value if the target pixel is the B pixel, with the following Equation:

$$RB_{RB} = \frac{P_{11}+6*P_{31}+P_{51}+6*P_{13}+36*P_{33}+6*P_{53}+P_{15}+6*P_{35}+P_{55}}{64},$$

the second extraction component extracts the G luminance component value if the target pixel is one of the R or B pixel, with the following Equation:

$$G_{RB\_W0} = \frac{P_{32}+P_{23}+P_{43}+P_{34}}{4},$$

the third extraction component extracts the B luminance component value if the target pixel is the R pixel, and extracts the R luminance component value if the target pixel is the B pixel, with the following Equation:

$$BR_{RB} = \frac{P_{22}+P_{24}+P_{42}+P_{44}}{4},$$

the fourth extraction component extracts the R luminance component value if the target pixel is the Gr pixel, and extracts the B luminance component value if the target pixel is the Gb pixel, with the following Equation:

$$RB_{GG} = \frac{P_{21}+P_{41}+6*P_{23}+6*P_{43}+P_{25}+P_{45}}{16},$$

the fifth extraction component extracts the G luminance component value if the target pixel is the Gr or Gb pixel, with the following Equation:

$$G_{GG\_W0} = \frac{P_{22}+P_{42}+4*P_{33}+P_{24}+P_{44}}{8},$$

and
the sixth extraction component extracts the B luminance component value if the target pixel is the Gr pixel, and extracts the R luminance component value if the target pixel is the Gb pixel, with the following Equation:

$$BR_{GG} = \frac{P_{12}+6*P_{32}+P_{52}+P_{14}+6*P_{34}+P_{54}}{16}.$$

3. The image processing apparatus of claim 2, wherein each of the second and fifth extraction components extracts the luminance component value of the target pixel by reflecting a different weight parameter of each pixel if the target pixel is determined as one of a horizontal or vertical edge pixel.

4. The image processing apparatus of claim 3, wherein the second extraction component uses the following Equation:

$$G_{RB\_Wm} = \frac{(P_{23}+P_{43})*a+(P_{32}+P_{34})*b}{8*2^m},$$

if a weight parameter m is set as 1 and the image edge is arranged in a vertical direction, a=7 and b=1, and if the weight parameter m is set as 1 and the image edge is arranged in a horizontal direction, a=1 and b=7,
if the weight parameter m is set as 2 and the image edge is arranged in the vertical direction, a=15 and b=1, and if the weight parameter m is set as 2 and the image edge is arranged in the horizontal direction, a=1 and b=15, if the weight parameter m is set as 3 and the image edge is arranged in the vertical direction, a=31 and b=1, and if the weight parameter m is set as 3 and the image edge is arranged in the horizontal direction, a=1 and b=31, and the fifth extraction component is configured to use an Equation:

$$G_{GG\_Wm} = \frac{P_{22} + P_{42} + c*P_{33} + P_{24} + P_{44}}{8*2^m},$$

wherein if the weight parameter m is set as 1, c=12,
if the weight parameter m is set as 2, c=28,
if the weight parameter m is set as 3, c=60.

5. The image processing apparatus of claim 1, wherein the edge determination module comprises:
an edge detection component configured to detect horizontal target component $E_H$ and vertical edge target component $E_V$ associated with the target pixel;
a reference value setting component configured to set a reference value for edge determination with respect to the target pixel using the Bayer image pattern; and
an edge determination component configured to determine whether the target pixel is an edge pixel and the direction of the image edge by comparing a horizontal and a vertical edge target component with the reference value.

6. The image processing apparatus of claim 5, wherein the edge detection component configured to use the n×n Bayer image pattern in which n is set as 5, the target pixel as $P_{33}$, and a pixel arranged in an I-th row and a j-th column as $P_{ij}$,
the edge detection component configured to detect the horizontal edge target component $E_H$ by calculating a horizontal difference using a row to which the target pixel belongs and adjacent upper and lower rows and calculating an arithmetic average wherein,
the calculating of the horizontal difference is undertaken using Equations:

$$E_{H1}=|P_{33}-P_{13}|+|P_{43}-P_{23}|+|P_{32}-P_{12}|+|P_{34}-P_{14}|$$

$$E_{H2}=|P_{33}-P_{53}|+|P_{23}-P_{43}|+|P_{32}-P_{52}|+|P_{34}-P_{54}|$$

the calculating of the arithmetic average of $E_{H1}$ and $E_{H2}$ is undertaken using Equation:

$$E_H = \frac{E_{H1}}{4} + \frac{E_{H2}}{4},$$

and
the edge detection component detects the vertical edge target component $E_V$ by calculating a vertical difference using a column to which the target pixel belongs and adjacent left and right columns and calculating an arithmetic average wherein,
the calculating of the vertical difference is undertaken using Equations:

$$E_{V1}=|P_{33}-P_{31}|+|P_{34}-P_{32}|+|P_{23}-P_{21}|+|P_{43}-P_{41}|$$

$$E_{V2}=|P_{33}-P_{35}|+|P_{32}-P_{34}|+|P_{23}-P_{25}|+|P_{43}-P_{45}|$$

the calculating of the arithmetic average of $E_{V1}$ and $E_{V2}$ is undertaken using Equation:

$$E_V = \frac{E_{V1}}{4} + \frac{E_{V2}}{4}.$$

7. The image processing apparatus of claim 5, wherein the reference value setting component is configured to set the reference value for edge determination by assigning a first average luminance value of the target pixel and adjacent surrounding pixels within a 5×5 pixel block to a predetermined adaptive curve if the target pixel is one of a Gr or a Gb pixel, and
the reference value setting component is configured to set the reference value for edge determination by assigning a second average luminance value of the target pixel and the adjacent surrounding pixels within the 5×5 pixel block to the predetermined adaptive curve if the target pixel is an R or B pixel,
wherein the first average luminance value is obtained by using the following Equation:

$$G_{GG} = \frac{\begin{array}{c}P_{11} + P_{31} + P_{51} + P_{22} + P_{42} + P_{13} + P_{33}*4 + \\ P_{53} + P_{24} + P_{44} + P_{15} + P_{35} + P_{55}\end{array}}{16},$$

and
the second average luminance value is obtained by using the following Equation:

$$G_{RB} = \frac{\begin{array}{c}P_{21} + P_{41} + P_{12} + 2*P_{32} + P_{52} + 2*P_{23} + 2*P_{43} + \\ 2*P_{34} + P_{14} + P_{54} + P_{25} + P_{45}\end{array}}{16}.$$

8. The image processing apparatus of claim 5, wherein the edge determination component is configured to determine that the target pixel is a flat pixel if the vertical and horizontal edge target components of the target pixel do not reach the reference value for edge determination,
the edge determination component is configured to determine that the target pixel is a vertical edge pixel if the vertical edge target component is greater than the horizontal edge target component and greater than the reference value for edge determination, and
the edge determination component is configured to determine that the target pixel is a horizontal edge pixel if the horizontal edge target component is greater than the vertical edge target component and greater than the reference value for edge determination.

9. The image processing apparatus of claim 1, further comprising a noise removal module, comprising:
a threshold value setting component configured to set a threshold value for determining whether image noise is generated in the target pixel;
a noise determination component configured to determine whether to remove the image noise from the target pixel; and
a noise removal component configured to remove the image noise with respect to R and B luminance component values of the target pixel.

10. An image processing system comprising: a storage apparatus configured to store image data of a plurality of pixels to be processed;
an image processing apparatus configured to perform image processing with respect to image data of a target pixel using a Bayer image pattern comprising the target pixel in a central portion of the Bayer image pattern, and the image processing apparatus including an edge determination module configured to determine whether the target pixel is an edge pixel and a direction of an image edge if the target pixel is determined as an edge pixel, and a demosaicing module configured to extract a luminance component value of the target pixel using the Bayer image pattern, a target pixel classification component configured to classify the target pixel as a Red, Blue, Gr or Gb pixel, a first, a second and a third individual extraction components each configured to respectively extract red (R), blue (B) and green (G) luminance component values of the target pixel if the target pixel is classified as an R or B pixel; and fourth, fifth and sixth individual extraction components each configured to respectively extract R, B and G luminance component values of the target pixel if the target pixel is classified as a Gr or Gb pixel.

11. The image processing system of claim 10, wherein each of the second and fifth extraction components is configured to extract the luminance component value of the target pixel by reflecting a different weight parameter of each pixel if the target pixel is a horizontal edge pixel or a vertical edge pixel.

12. The image processing system of claim 10, wherein the edge determination module comprises:

an edge detection component configured to detect a horizontal edge target component and a vertical edge target component for edge determination with respect to the target pixel;

a reference value setting component configured to set a reference value for edge determination with respect to the target pixel using the Bayer image pattern; and an edge determination component configured to determine whether the target pixel is an edge pixel and the direction of the image edge by comparing the horizontal edge target component and the vertical edge target component with the reference value.

13. The image processing system of claim 12, wherein the edge determination component is configured to determine that the target pixel is a flat pixel if the vertical edge target component and horizontal edge target component of the target pixel do not reach the reference value for edge determination, the edge determination component determines that the target pixel is a vertical edge pixel if the vertical edge target component is greater than the horizontal edge target component and greater than the reference value for edge determination, and the edge determination component determines that the target pixel is a horizontal edge pixel if the horizontal edge target component is greater than the vertical edge target component and greater than the reference value for edge determination.

14. The image processing system of claim 10, wherein the image processing apparatus further comprises a noise removal module, including:

a threshold value setting component configured to set a threshold value for determining whether image noise is generated in the target pixel;

a noise determination component configured to determine whether the image noise should be removed from the target pixel; and a noise removal component configured to remove the image noise with respect to R and B luminance component values of the target pixel.

15. The image processing system of claim 10, wherein the storage apparatus is configured to store image data of the target pixel being processed by the image processing apparatus and the storage apparatus is configured to replace processed image data with image data to be processed.

16. A method comprising:

determining a direction of an edge of an image based on whether a target pixel is an edge pixel; and extracting, based on whether the target pixel is an edge pixel, a luminance component value of the target pixel using a Bayer image pattern, classifying the target pixel as a Red, Blue, Gr or Gb pixel, extracting via a first, a second and a third individual extraction component to respectively extract red (R), blue (B) and green (G) luminance component values of the target pixel if the target pixel is classified as an R or B pixel; and extracting via fourth, fifth and sixth individual extraction components to respectively extract R, B and G luminance component values of the target pixel if the target pixel is classified as a Gr or Gb pixel.

17. The method of claim 16 further comprising:

extracting the luminance component value of the target pixel based on a weight parameter of pixels adjacent to the target pixel based on whether the direction indicates that the target pixel is one of a horizontal or vertical.

18. The method of claim 16 further comprising:

setting a threshold value for determining whether image noise is generated in the target pixel; and removing image noise with respect to luminance component values of the target pixel based on the image noise in relation to the threshold value.

* * * * *